United States Patent
Chao et al.

(10) Patent No.: US 10,418,002 B2
(45) Date of Patent: Sep. 17, 2019

(54) MERGED ACCESS UNITS IN FRAME BUFFER COMPRESSION

(71) Applicant: MEDIATEK INC., Hsinchu (TW)

(72) Inventors: Ping Chao, Taipei (TW); Ting-An Lin, Hsinchu (TW); Tung-Hsing Wu, Chiayi (TW); Kung-Tsun Yang, Hsinchu (TW); Wan-Yu Chen, Yonghe (TW); Chuang-Chi Chiou, Zhubei (TW); Ping-yao Wang, Taipei (TW); Wei-Gen Wu, Taoyuan (TW); Hsin-Hao Chung, Hsinchu (TW); Chih-Ming Wang, Zhubei (TW); Han-Liang Chou, Baoshan Township (TW); Chung Hsien Lee, Zhubei (TW); Yung-Chang Chang, New Taipei (TW); Chi-Cheng Ju, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 10 days.

(21) Appl. No.: 15/786,240

(22) Filed: Oct. 17, 2017

(65) Prior Publication Data
US 2018/0108331 A1 Apr. 19, 2018

Related U.S. Application Data

(60) Provisional application No. 62/489,588, filed on Apr. 25, 2017, provisional application No. 62/409,416, filed on Oct. 18, 2016.

(51) Int. Cl.
G09G 5/393 (2006.01)
G09G 5/395 (2006.01)
(Continued)

(52) U.S. Cl.
CPC ......... G09G 5/393 (2013.01); G06F 13/1673 (2013.01); G09G 5/39 (2013.01);
(Continued)

(58) Field of Classification Search
CPC ....................................... G09G 5/393
See application file for complete search history.

(56) References Cited

U.S. PATENT DOCUMENTS

| 4,772,956 A | * | 9/1988 | Roche | H04N 7/24 358/426.01 |
| 2002/0159519 A1 | * | 10/2002 | Tabatabai | H04N 5/4401 375/240.01 |
| 2009/0238259 A1 | * | 9/2009 | Yeh | H04N 19/50 375/240.01 |

(Continued)

*Primary Examiner* — Jitesh Patel
(74) *Attorney, Agent, or Firm* — Oblon, McClelland, Maier & Neustadt, L.L.P.

(57) ABSTRACT

Aspects of the disclosure provide a method for merging compressed access units according to compression rates and/or positions of the respective compressed access units. The method can include receiving a sequence of compressed access units corresponding to a sequence of raw access units partitioned from an image or a video frame and corresponding to a sequence of memory spaces in a frame buffer, determining a merged access unit including at least two consecutive compressed access units based on compression rates and/or positions of the sequence of compressed access units. The merged access unit is to be stored in the frame buffer with a reduced gap between the at least two consecutive compressed access units compared with storing the at least two consecutive compressed access units in corresponding memory spaces in the sequence of memory spaces.

19 Claims, 8 Drawing Sheets

(51) Int. Cl.
  *H04N 19/423* (2014.01)
  *G09G 5/39* (2006.01)
  *H04N 19/426* (2014.01)
  *H04N 19/39* (2014.01)
  *H04N 19/59* (2014.01)
  *G06F 13/16* (2006.01)
  *H04N 1/32* (2006.01)

(52) U.S. Cl.
  CPC ......... *G09G 5/395* (2013.01); *H04N 1/32593* (2013.01); *H04N 19/39* (2014.11); *H04N 19/423* (2014.11); *H04N 19/428* (2014.11); *H04N 19/59* (2014.11); *G09G 2330/021* (2013.01); *G09G 2340/02* (2013.01); *G09G 2350/00* (2013.01); *G09G 2360/121* (2013.01); *G09G 2360/122* (2013.01); *G09G 2360/123* (2013.01); *G09G 2360/125* (2013.01); *G09G 2360/127* (2013.01); *G09G 2360/128* (2013.01); *G09G 2360/18* (2013.01); *Y02D 10/14* (2018.01)

(56) References Cited

U.S. PATENT DOCUMENTS

| | | | |
|---|---|---|---|
| 2010/0195924 A1* | 8/2010 | Park | H04N 19/15 382/239 |
| 2011/0002396 A1* | 1/2011 | Ivanov | H04N 19/105 375/240.24 |
| 2011/0080956 A1* | 4/2011 | Zhou | H04N 19/61 375/240.24 |
| 2013/0243100 A1* | 9/2013 | Liu | H04N 19/105 375/240.25 |
| 2014/0177710 A1* | 6/2014 | Komi | H04N 19/172 375/240.12 |
| 2014/0254669 A1* | 9/2014 | Rapaka | H04N 19/50 375/240.12 |
| 2014/0254929 A1* | 9/2014 | Wu | H04N 19/129 382/166 |
| 2015/0155002 A1* | 6/2015 | Cheng | H04N 19/13 386/355 |
| 2015/0187045 A1* | 7/2015 | Chou | H04N 19/436 345/547 |
| 2016/0249052 A1* | 8/2016 | Komiya | H04N 19/46 |

* cited by examiner

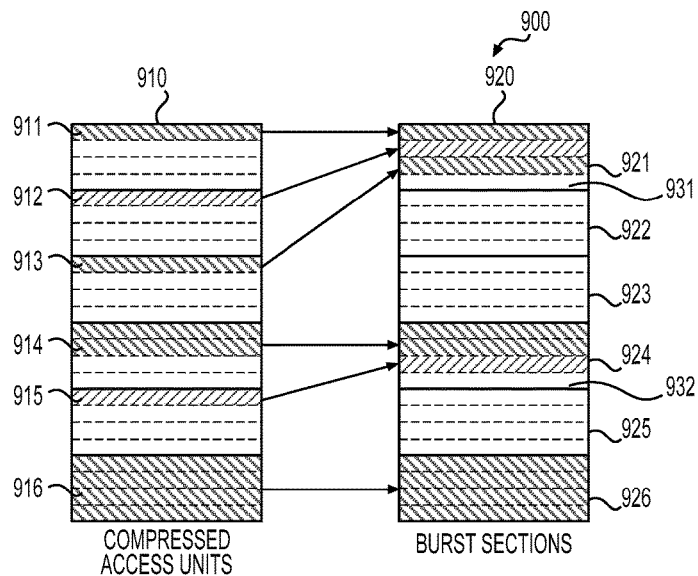
FIG. 9
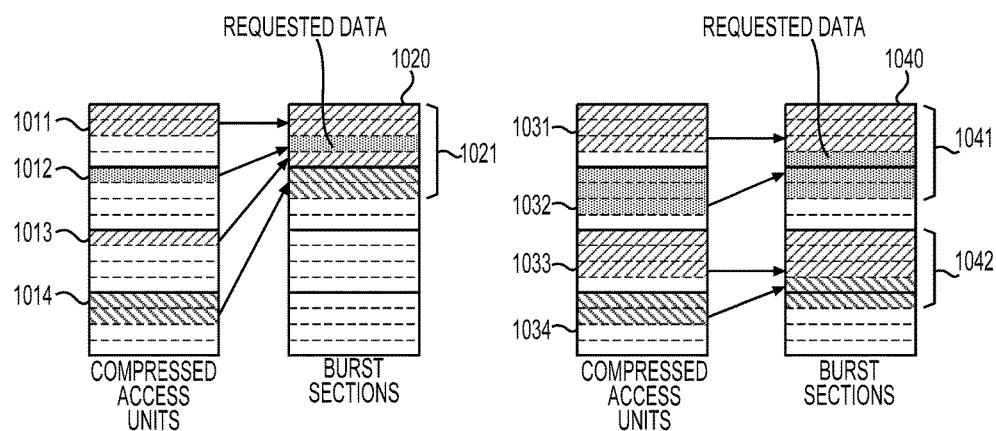
FIG. 10A   FIG. 10B

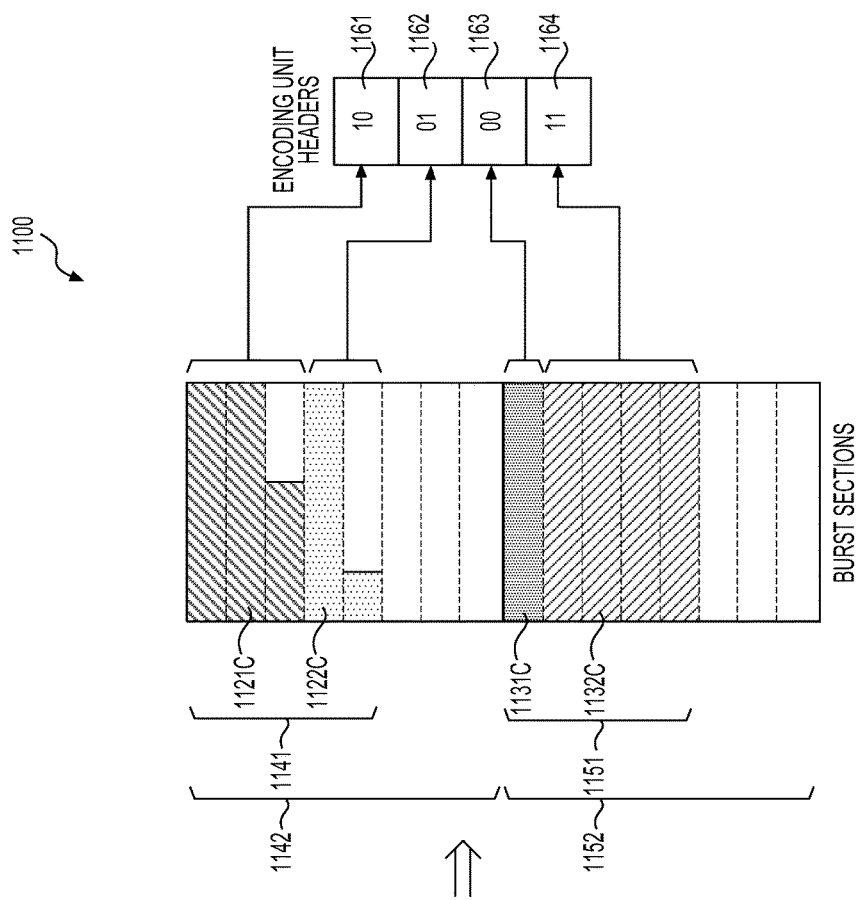
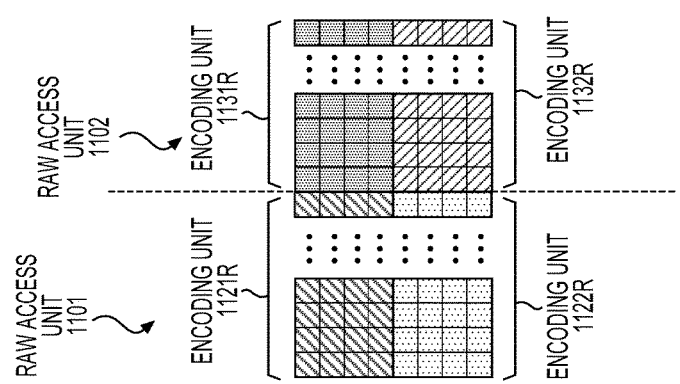
FIG. 11

MERGED ACCESS UNITS IN FRAME BUFFER COMPRESSION

INCORPORATION BY REFERENCE

This present disclosure claims the benefit of U.S. Provisional Application No. 62/409,416, "UFO Format" filed on Oct. 18, 2016, and U.S. Provisional Application No. 62/489,588, "Memory Access Efficiency Optimization for Frame Buffer Compression" filed on Apr. 25, 2017, which are incorporated herein by reference in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Multimedia applications, such as video encoding and decoding, require heavy data traffic between a video processing core and a frame memory. For example, a video codec can adopt data-transfer-intensive coding tools, such as bidirectional prediction, interleaved video, and multiple reference frames, which induce heavy data reference to a frame memory. Memory bandwidth requirements can be in the range of 5 Gb/s to 30 Gb/s in some multimedia applications. High memory bandwidth requirements lead to expensive memory system and high power consumption thus should be minimized.

SUMMARY

Aspects of the disclosure provide a method for merging compressed access units according to compression rates and/or positions of the respective compressed access units. As a result, a resultant merged access unit stored in a frame buffer can later be accessed with higher memory access efficiency than storing and reading the respective compressed access units separately. The method can include receiving a sequence of compressed access units corresponding to a sequence of raw access units partitioned from an image or a video frame, and corresponding to a sequence of memory spaces in a frame buffer, determining a merged access unit including at least two consecutive compressed access units based on compression rates and/or positions of the sequence of compressed access units. The merged access unit is to be stored in the frame buffer with a reduced gap between the at least two consecutive compressed access units compared with storing the at least two consecutive compressed access units in corresponding memory spaces in the sequence of memory spaces.

In an embodiment, the frame buffer includes a sequence of burst sections partitioned by burst boundaries corresponding to the sequence of memory spaces, and the method further comprises storing the merged access unit into the frame buffer, wherein the merged access unit is aligned to a burst boundary of the frame buffer, and members of the merged access unit are adjacent to each other. In an embodiment, the method can further include when a set of consecutive compressed access units as a whole has a compression rate larger than a preselected percentage, determining to merge the set of consecutive compressed access units into a merged access unit. In another embodiment, the method can further include determining a merged access unit including a maximum number of consecutive compressed access units that can be contained in a preselected number of consecutive burst sections. In a further embodiment, the method further includes avoiding arranging compressed access units belonging to different tiles in the image or the video frame in a same merged access unit. In an embodiment, the method can further include avoiding arranging a first compressed access unit adjacent to a first boundary of a tile or the image or the video frame and a second compressed access unit adjacent to a second boundary of the tile or the image or the video frame in a same merged access unit, the second boundary being opposite to the first boundary.

Embodiments of the method can include receiving an updated compressed access unit having a larger size than a to-be-updated compressed access unit that belongs to a merged access unit and is aligned with a burst boundary of a first burst section in the frame buffer, and storing the updated compressed access unit at a starting address in a second burst section that is a previous adjacent burst section in the sequence of burst sections.

In an embodiment, the method further includes generating a sequence of merge information each corresponding to a compressed access unit or a merged access unit indicating how the sequence of compressed access units are merged into merged access units such that when an compressed access unit is requested, a merged access unit including the requested access unit can be determined according to the merge information. The merge information can be represented with one of a merge enable tag assigned for each compressed access unit, an address offset of each compressed access unit with respect to a home address of each compressed access unit, and a total size of uncompressed access units corresponding to members of a merged access unit.

In an embodiment, each compressed access unit includes at least two compressed encoding units each having a length. Accordingly, in one example, the method can further includes generating a sequence of encoding unit headers each corresponding to a compressed encoding unit and including length information of the respective compressed encoding unit. In another example, the method can further include generating a sequence of merge headers each corresponding to a compressed access unit. Each merge header can include at least two fields each storing length information of the respective at least two compressed encoding units in the respective compressed access unit, and a further field storing an address offset of the respective compressed access unit with respect to a home address of the respective compressed access unit. In addition, the sequence of compressed access units and the sequence of merge headers can be stored separately with configurable starting addresses.

In various embodiments, the frame buffer is one of a random access memory (RAM), a static RAM (SRAM), a dynamic RAM (DRAM), an asynchronous DRAM, a synchronous DRAM (SDRAM), a double data rate SDRAM (DDR SDRAM), a flash memory.

Aspects of the disclosure provide a method for accessing a frame buffer that can includes merged access units. The method can include receiving a request for reading a compressed access unit from the frame buffer storing a sequence of compressed access units part of which are merged into merged access units and a sequence of merge information corresponding to each compressed access unit or merged access unit indicating how compressed access units are merged into the merged access units, determining a merged access unit including the requested access unit according to merge information related with the requested compressed access unit, and reading compressed data in the determined merged access unit that includes the requested access unit from the frame buffer.

Embodiments of the method can further include when a size of the merged access unit is above a threshold, reading the requested access unit from the frame buffer. In one embodiment, the frame buffer includes a sequence of burst sections partitioned by burst boundaries, the merged access units are each aligned to a burst boundary of the frame buffer, and members of each merged access unit are adjacent to each other.

In an embodiment, reading merge information related with the requested compressed access unit from the frame buffer includes one of reading merge information corresponding to the requested compressed access unit and compressed access units neighboring the requested access unit in the sequence of compressed access units, and reading merge information corresponding to the merged access unit that includes the requested access unit.

Aspects of the disclosure provide an apparatus including circuitry configured to receive a sequence of compressed access units corresponding to a sequence of raw access units partitioned from an image or a video frame, and corresponding to a sequence of memory spaces in a frame buffer, and determine a merged access unit including at least two consecutive compressed access units based on compression rates and/or positions of the sequence of compressed access units. The merged access unit is to be stored in the frame buffer with a reduced gap between the at least two consecutive compressed access units compared with storing the at least two consecutive compressed access units in corresponding memory spaces in the sequence of memory spaces.

BRIEF DESCRIPTION OF THE DRAWINGS

Various embodiments of this disclosure that are proposed as examples will be described in detail with reference to the following figures, wherein like numerals reference like elements, and wherein:

FIG. 9 shows an example of an access unit merging process according to an embodiment of the disclosure;

FIGS. 10A-10B show examples of reading a compressed access unit with burst access according to an embodiment of the disclosure;

FIG. 11 shows an example of a frame buffer format according to an embodiment of disclosure;

DETAILED DESCRIPTION OF EMBODIMENTS

Figure 1:
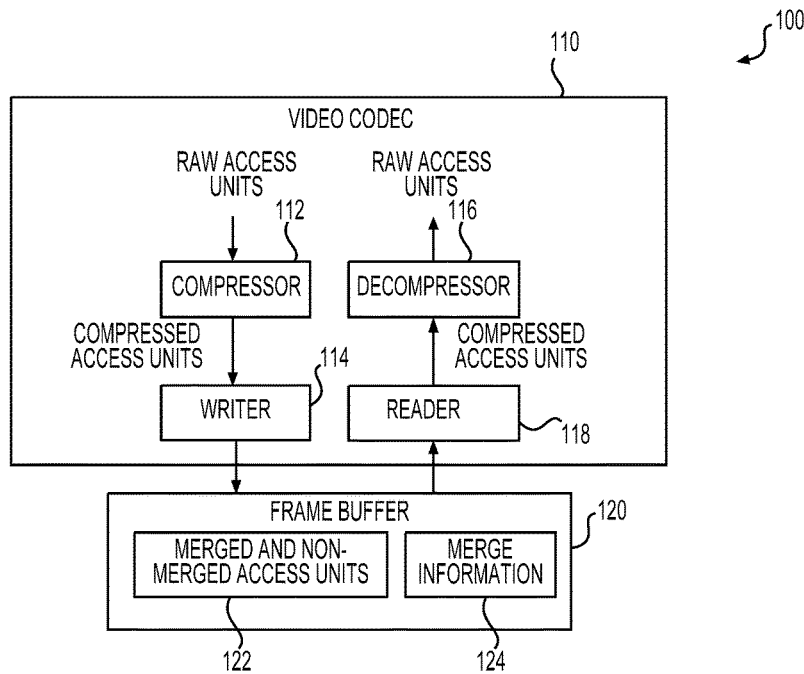
FIG. 1 shows a video coding system according to an embodiment of the disclosure.

FIG. 1 shows a video coding system 100 according to an embodiment of the disclosure. The video coding system 100 can include a video codec 110, and a frame buffer 120. The video codec 110 can include a compressor 112, a writer 114, a decompressor 116, and a reader 118. Those components are coupled together as shown in FIG. 1. The video codec 110 can be configured to perform an encoding or decoding process according to a video coding standard, such as the High Efficiency Video Coding (HEVC)/H.265 standard. Accordingly, the video codec can employ reference frames which can be stored to the frame buffer 120.

In one example, in order to save memory access bandwidth, reference frames can first be compressed before being stored into the frame buffer 120. Accordingly, the compressor 112 and the decompressor 116 can be employed to perform compression and decompression functions, respectively. For example, a reference frame can be partitioned into a sequence of access units each including a block of pixels, for example, a block of 16×4 pixels. Each access unit can be treated as a whole when being compressed or during a memory access operation. During a write process, the compressor 112 can receive an access unit, referred to as a raw access unit, and perform a compression process to generate a compressed access unit that can be subsequently stored into the frame buffer 120. Conversely, during a read process, the decompressor 116 can receive the compressed access unit fetched from the frame buffer 120, and perform a decompression process to recover the raw access unit. In various examples, various lossless or lossy compression methods or algorithms can be employed at the compressor 112 or the decompressor 116.

The writer 114 can be configured to store compressed access units into the frame buffer 120. For example, the writer 114 can specify a memory address and request the frame buffer 120 to store one or more compressed access units to that specified address. Particularly, according to an aspect of the disclosure, the writer 114 can employ an access unit merging scheme to improve memory access efficiency. In one example, the memory efficiency can be measured with an amount of data read from or written into a frame memory during a time period. For example, the writer 114 can be configured to perform an access unit merging process before writing a set of compressed access units into the frame buffer 120.

During the process, the writer 114 can determine whether and how to merge at least two compressed access units into a merged access unit based on compression rates of the respective compressed access units. The merged access unit can later be read from the frame buffer 120 more quickly than storing and reading the compressed access units separately. In addition, the writer 114 can accordingly generate merge information indicating how the set of access units are merged such that member access units of merged access units are addressable. Thereafter, the writer 114 can write the merged or non-merged access units into the frame buffer 120 according to the merge decision. The merge information can also be stored to the frame buffer 120.

The reader 114 can be configured to fetch merged or non-merged access units from the frame buffer 120. Particularly, when reading an access unit, the reader 114 can adaptively determine to read multiple neighboring access units of the intended access unit together from the frame buffer 120.

The frame buffer 120 can be configured to store merged and non-merged access units 122 and merge information 124. The frame buffer 120 can be various types of memory, such as a random access memory (RAM), a static RAM (SRAM), a dynamic RAM (DRAM), an asynchronous DRAM, a synchronous DRAM (SDRAM), a double data rate SDRAM (DDR SDRAM), a flash memory, and the like. In addition, the frame buffer 120 can include a memory controller (not shown) that receives requests from the video codec and issue commands to control write or read memory access operations.

In addition, the frame buffer 120 can have boundaries, for example, on every 128 bytes, 256 bytes, or 512 bytes, in a logical memory space of the frame buffer 120. Access to data stored across those boundaries can be inefficient compared with storing the same data within two boundaries. For example, the boundaries can be related with configurations of the frame buffer 120, such as channel mapping, bank mapping, or burst mode configurations. For example, the frame buffer 120 can be configured to operate in a burst mode. When the frame buffer 120 operates in the burst mode, data stored at a segment of consecutive logic addresses can be fetched during one burst access, which is more efficient than fetching the data one address by one address in a non-burst mode. In one example, a size of memory space corresponding to the segment of consecutive logic addresses can be determined by a burst length that is configured to the frame buffer 120. Accordingly, the frame buffer 120 in logic space can be partitioned into a sequence of such segments, and borders of such sequence of segments can form the boundaries of the frame buffer 120. Thus, the boundaries in the frame buffer 120 are referred to as burst boundaries, while segments between boundaries are referred to as burst sections.

Accordingly, in one example, a size of raw access units is configured to match a size of burst sections in the frame buffer 12 such that memory access to the frame buffer 120 can benefit from the high memory access efficiency caused by the burst access mode. For example, the size of raw access units can be configured to be equal to the size of the burst sections. Thus, each compressed access unit can be stored within a burst section even for a raw access unit with a zero compression rate. In this way, a sequence of compressed access units in a video frame can correspond to a sequence of memory spaces, and each such memory space can correspond to a burst section.

Figure 2:
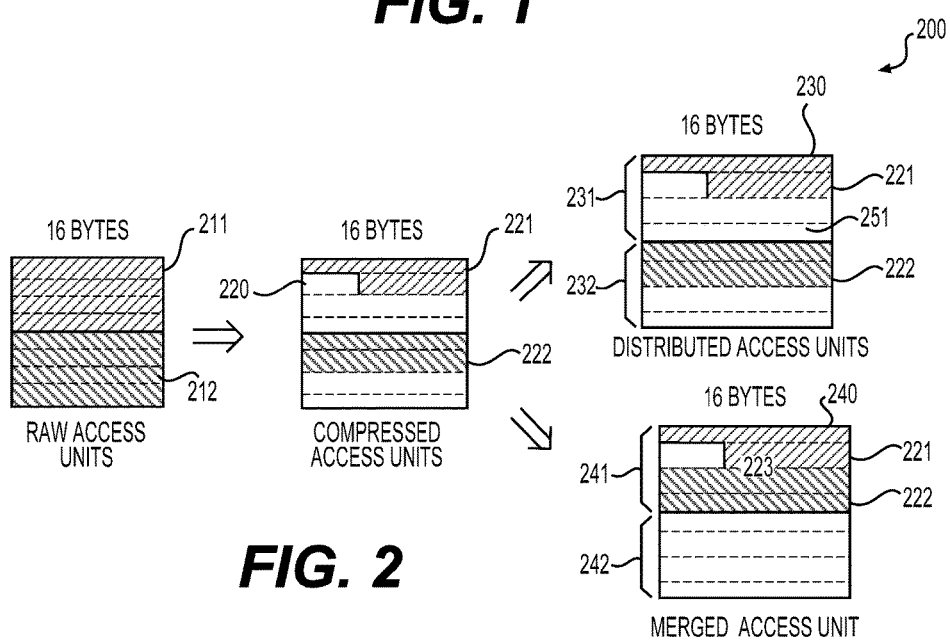
FIG. 2 shows an access unit merging example according to an embodiment of the disclosure.

FIG. 2 shows an access unit merging example according to an embodiment of the disclosure. Two neighboring raw access units 211 and 212 are shown at the left side. The two raw access units 211 and 212 can correspond to two neighboring blocks of pixels in a reference frame. As shown, each raw access unit 211 or 212 includes 4 words, and each word is 16 bytes long. After a compression process at the compressor 112, the two raw access units 211 and 212 can be compressed into two compressed access units 221 and 222, respectively, each having a reduced size of 2 words. A last word 220 of the compressed access unit 221 is filled partly by compressed data. Subsequently, the two compressed access units 221 and 222 can be stored into the frame buffer 120.

Two memory maps 230 and 240 are shown at the right side of FIG. 2 corresponding to two different methods for placing the two compressed access units 221 and 222. As shown on the memory maps 230 and 240, the memory buffer 120 can be configured with burst sections each having a size (or length) of 4 words, such as burst sections 231-231, and 241-242. Particularly, in FIG. 2 example, a size of the burst section is configured to be equal to the size of raw access units 211 and 212. However, in other examples, a burst section of a frame buffer can be smaller than a size of raw access units. In a first placing method as shown in the memory map 230, the compressed access units 221 and 222 are distributed into two neighboring memory spaces, namely the burst sections 231 and 232, and aligned to an upper burst boundary of the respective burst section 231-232. Under such arrangement, fetching the two compressed access units 221 and 222 can be completed with two burst accesses. As shown, a gap 251 can exist between the compressed access units 221 and 222.

In contrast, in a second placing method as shown in a memory map 240, the compressed access units 221 and 222 are merged into a merged access unit 223 and placed within the same burst section 241. Fetching the merged access units 223 can be completed with only one burst access, which is faster than in the first placing method. Specifically, compared with the arrangement in memory map 230, the compressed access unit 222 is shifted upwards two words becoming adjacent to the compressed access unit 221. As a result, the gap 251 has been reduced to zero, and there is no gap in word level between the compressed access units 221 and 222. In addition, the merged access unit 223 is aligned to an upper burst boundary of the burst section 241. Further, each compressed access units 221 or 222 is word-aligned, and compressed data of the compressed access units 221 and 222 does not mix with each other in each word of the merged access unit 223. For example, a word on the memory map 230 and 240 can have a size equal to an amount of data that can be read from the frame buffer 120 by one data transfer on a data bus of the memory frame buffer 120. Accordingly, storing data in word-aligned manner can benefit the random access to access unit 222 with a higher efficiency than separate the same data into different words. In alternative example, the gap between the compressed access units 221 and 222 can also be reduced in byte level or bit level, while it may increase the size of merge information.

Figure 3:
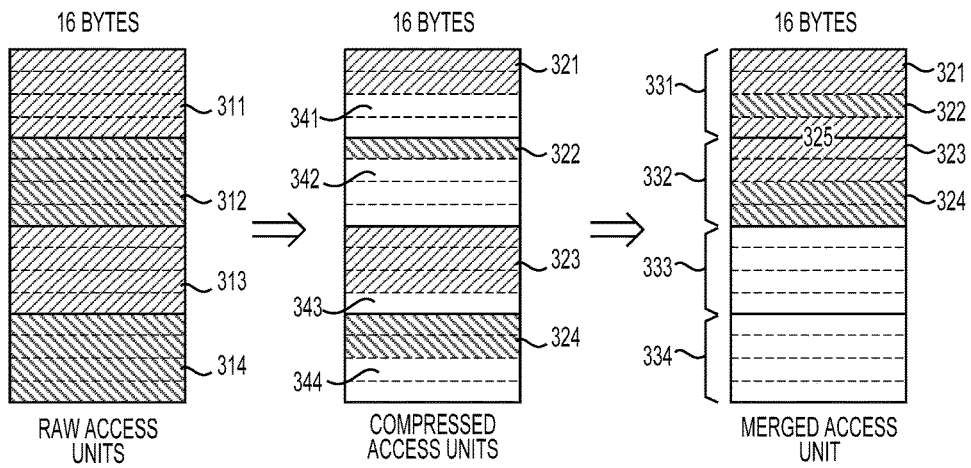
FIG. 3 shows another access unit merging example according to an embodiment of the disclosure.

FIG. 3 shows another access unit merging example according to an embodiment of the disclosure. Four neighboring raw access units 311-314 are shown at the left side of FIG. 3. The four raw access units 311-314 can correspond to four neighboring blocks of pixels in a reference frame. Each raw access unit 311-314 includes 4 words, and each word is 16 bytes long. After a compression process at the compressor 112, the four raw access units 311-314 can be compressed into four compressed access units 321-324, respectively, each having a reduced size of 2, 1, 3, and 2 words, respectively. Subsequently, the four compressed access units 321-324 can be merged and stored into the frame buffer 120 which is configured with burst sections having a size of 4 words (such as burst sections 331-334). Accordingly, fetching the four compressed access units 321-324 can be completed with two burst accesses. Compared with distributing the four access units 321-324 into the four burst sections 331-334, two burst accesses can be saved. As shown, assuming the four access units 321-324 are stored into four corresponding burst sections without merging in a way similar to the scenario shown on the memory map 230, gaps 341-344 can exist between the four access units 321-324. Merging the four access units 321-324 can reduce the gaps 341-344 to zero.

Access unit merging method shown in the FIG. 2 and FIG. 3 examples can benefit applications where a cache mechanism is employed. For example, during a motion estimation process performed at the codec 110, an area of a reference frame within a search window can be searched to find a reference block for a current block under processing. In such an example, when one access unit within the search window is first requested, fetching a compressed access unit including a group of compressed access units neighboring the requested access unit with burst access would improve memory access efficiency.

While in the examples of FIG. 2 and FIG. 3, merging multiple compressed access units to generate a merged access unit that is later accessed as a whole improves memory access efficiency, blindly merging compressed access units without consideration of compression rate or other factors may not improve performance of the frame memory 120. For example, for a random access to a particular compressed access unit in a merged access unit, un-requested data in the merged access unit can be read out of the frame buffer 120 together with the requested access unit during a burst access. The unrequested data consumes additional memory bandwidth resulting in a penalty for reading the merged access unit. The larger the size of the merged access unit, the larger the penalty.

For another example, when a compression rate of a merged access unit (defined as a ratio of a total size of raw access units corresponding to members of the merged access unit over a size of the merged access unit) is not high enough, benefit of reducing access time may not be realized. For example, in FIG. 2 example, assuming a compression rate of the merged access unit 223 is smaller than 50%, the merged access unit 223 would occupy the two burst sections 241 and 242. As a result, reading the merged access unit 223 can cost two burst accesses with no improvement to memory efficiency.

Accordingly, in one example, the writer 114 can be configured to determine whether to merge a set of compressed access units into a merged access unit according to compression rates of the set of compressed access units. When the compression rates of the set of compressed access units are high enough, the merged access unit can be generated. A number of the set of compressed access units under consideration can be a preselected number, such as 2, 3, 4, and the like.

For example, after receiving a set of compressed access units, the writer 114 can first calculate a compression rate of a merged access unit including the set of compressed access units. The writer 114 can be configured to determine to merge the set of compressed access units when the merged access unit having a compression rate higher than a preselected threshold, such as 50%. In contrast, when the resultant merged access unit having a compression rate lower than a preselected threshold, the set of compressed access units would not be merged. In this way, unrequested data penalty can be controlled to be below a certain level while memory efficiency improvement based on burst access can be realized.

Figure 4:
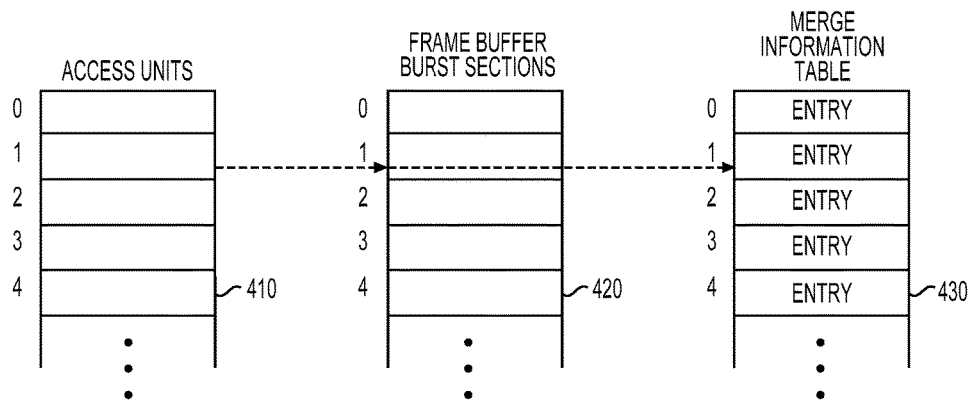
FIG. 4 shows a mapping relationship between a sequence of access units, a sequence of frame buffer burst sections, and a merge information table according to an embodiment of the disclosure.

FIG. 4 shows a mapping relationship between a sequence of access units 410, a sequence of frame buffer memory spaces (namely burst sections 420), and a merge information table 430 according to an embodiment of the disclosure. The access units 410 can correspond to a sequence of bocks in a reference frame, and can accordingly be ordered to form a sequence. For example, each access unit can have an index indicating a position of respective access unit in the sequence of access units 410. Assuming the distributed placing method indicated by the memory map 230 in FIG. 2 is employed, the access units 410, after being compressed, can be sequentially stored in the sequence of frame buffer burst sections 420. Thus, each raw or compressed access unit can correspond to a burst section. Based on this mapping relationship, when a compressed access unit is to be accessed, a burst section including the compressed access unit can be located, for example, based on an index of the compressed access unit. A starting address of the burst section (or memory space) storing the compressed access unit can be referred to as a home address of this compressed access unit.

As shown on the memory map 240 in FIG. 2, when the access unit merging scheme is employed, the compressed access unit 222 of the merged access unit 223 can be shifted away from its home address (starting address of the burst section 242) to a new address (referred to as a merge address) adjacent to the compressed access unit 221. An address offset (2 words as on the memory map 240) between the home address and the merge address can be included in merge information which can be used for positioning the compressed access unit 224 in the frame buffer 120.

The merge information table 430 can be stored in the frame buffer 120. The merge information table 430 can include a sequence of merge information entries. Merge information corresponding to each merge information entry can be generated at the writer 114 during an access unit merging process and stored into the frame buffer 120. The merge information can indicate whether a compressed access unit is merged with other compressed access units, and how a compressed access unit is merged. The merge information can be used to determine a location of a compressed access unit or a merged access unit in the frame buffer 120, thus making each compressed access unit or merged access unit addressable. Merge information can have different merge information formats in various examples.

As shown, in one example, the merge information table 430 can include an entry in each row. Each entry can be mapped to an access unit. Based on this mapping relationship, a position of an entry in the merge information table can be determined based on an index of an access unit 410. For example, during a read memory access, the reader 118 can first check the merge information table to determine a position of a compressed access unit in the frame buffer 120. Subsequently, the reader 118 can fetch the target access unit or together with other access units neighboring the target access unit in one merged access unit. In alternative examples, an entry of merge information may correspond to a merged access unit instead of a compressed access unit as shown in the FIG. 7 example.

Figure 5:
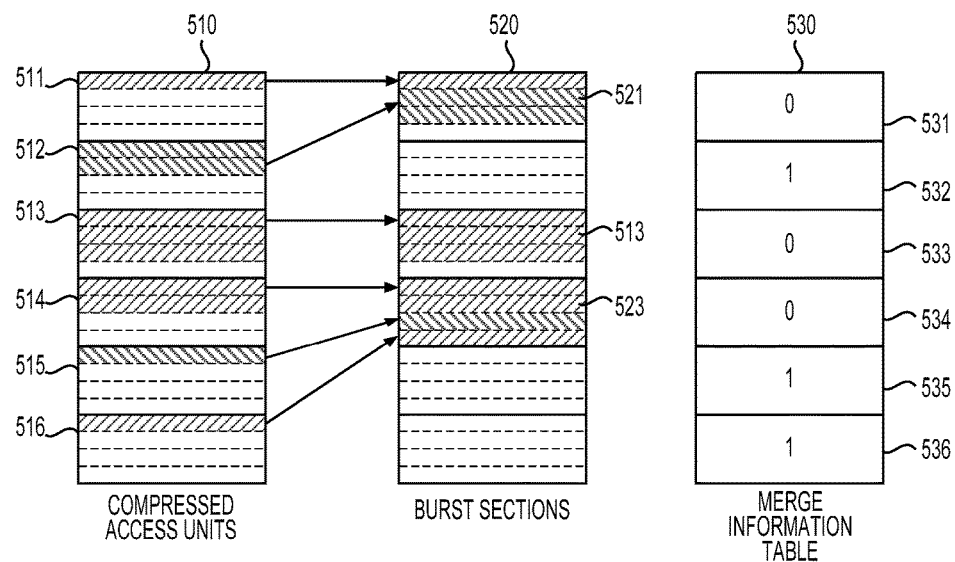
FIG. 5 shows a first merge information format according to an embodiment of the disclosure.

FIG. 5 shows a first example of the merge information format according to an embodiment of the disclosure. In the FIG. 5 example, a merge enable flag is used to indicate whether a compressed access unit is merged and shifted into a merged access unit. The merge enable flag can be represented by one or more bits. Specifically, a set of compressed access units 510, a group of burst sections 520, and a merge information table 530 are shown in FIG. 5. As shown, the compressed access units 511 and 512 are merged into a merged access unit 521. Accordingly, a flag of 0 is assigned to a first entry 531 of the merge information table 530 that corresponds to the compressed access unit 511, while a flag of 1 is assigned to a second entry 532 that corresponds to the compressed access unit 512. The flag of 0 can indicate that the compressed access unit 511 resides at a home address of the compressed access unit 511, while the flag of 1 can indicate that the compressed access unit 512 has been shifted from a home address of the compressed access unit 512 to a location adjacent to the compressed access unit 521.

The compressed access unit 513 is not merged with other compressed access unit 513, and resides at its home address. Accordingly, a flag of 0 can be assigned to a third entry 533. The compressed access units 514-516 are merged into a merged access unit 523. Accordingly, a flag of 0 can be assigned to a fourth entry 534, while a flag of 1 can be assigned to a fifth and sixth entries 535 and 536.

Figure 6:
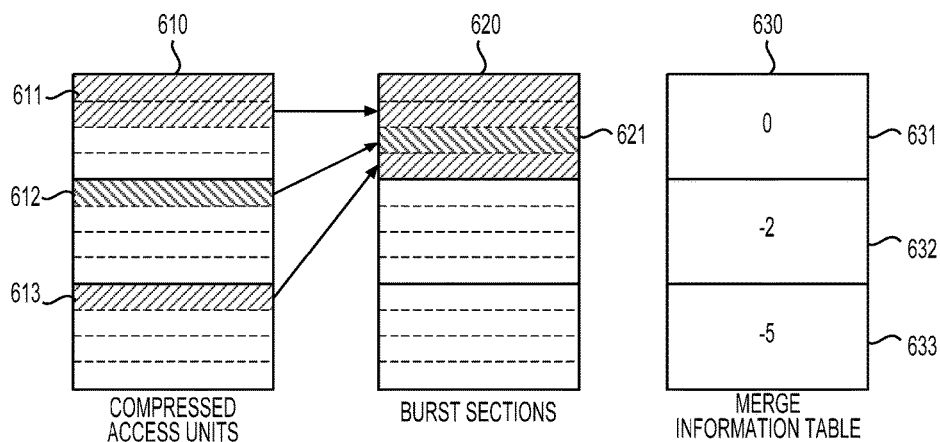
FIG. 6 shows a second merge information format according to an embodiment of the disclosure.

FIG. 6 shows a second example of the merge information format according to an embodiment of the disclosure. In the FIG. 6 example, an address offset is used to indicate a distance a compressed access unit has been shifted with respect to its home address. Specifically, a set of compressed access units 610, a group of burst sections 620, and a merge information table 630 are shown in FIG. 6. Three compressed access units 611-612 are merged into a merged access unit 621. The compressed access unit 612 is shifted up 2 words, while the compressed access unit 615 is shifted up 5 words. Accordingly, three address offsets, 0, −2, and −5, are assigned to entries 631-633 of the merge information table 630 which correspond to the compressed access units 611-613, respectively. Each address offset can indicate a distance between a merge address and a home address of a compressed access unit.

In the FIG. 6 example, a number of words are used as a measure in the merge information table 630 to indicate an address offset. In one example, a word can correspond to a number of bits read from a memory during a beat of a burst access which may equal to a memory bus width of the memory. However, in alternative examples, other measures different from the FIG. 6 example can be employed, such as byte or bit.

Figure 7:
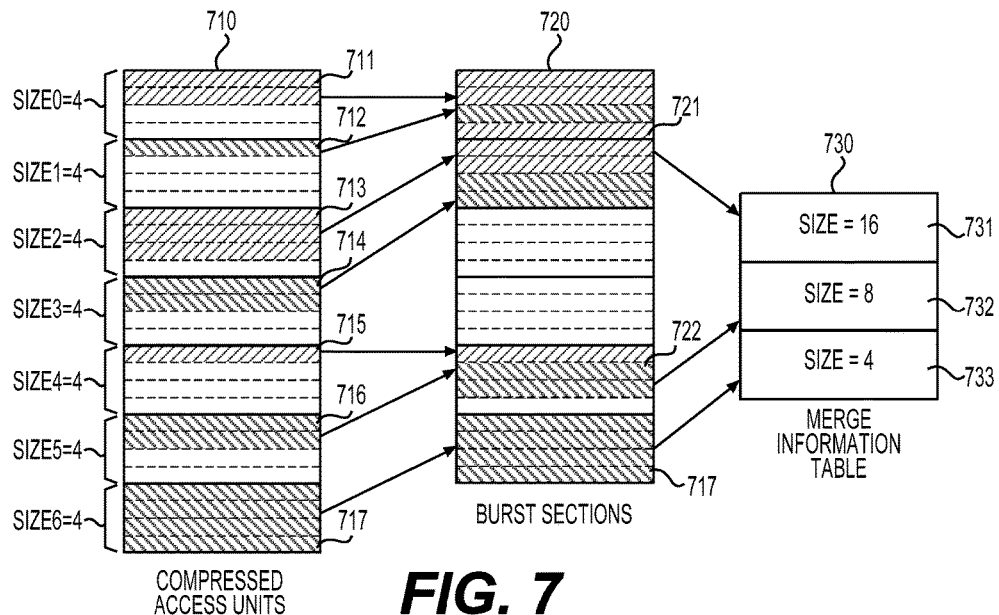
FIG. 7 shows a third merge information format according to an embodiment of the disclosure.

FIG. 7 shows a third example of the merge information format according to an embodiment of the disclosure. In the FIG. 7 example, a size of raw access units that are merged into a merged access unit can be used to indicate how many compressed access units are included in the merged access unit. Specifically, a set of compressed access units 710, a group of burst sections 720, and a merge information table 730 are shown in FIG. 7. The set of compressed access units 710 can correspond to a set of raw access units each having a size of 4 words. The compressed access units 711-714 are merged into a merged access unit 721, while the compressed access units 715-716 are merged into a merged access unit 722.

The merge information table 730 can include two entries 731-732 each correspond to one of the two merged access units 721 and 722. Particularly, the first entry 731 can include a total size (16 words) of raw access units corresponding to the compressed access units 711-714 that are merged into the merged access unit 721. Similarly, the second entry 732 can include a total size (8 words) of raw access units corresponding to the compressed access units 715-716 that are merged into the merged access unit 722. In contrast, the compressed access unit 717 does not merge with other compressed access units. Accordingly, a size of 4 words can be included in a third entry 733.

As a response to a request for a specific compressed access unit, the reader 118 can consult a merge information table to determine whether the target compressed access unit is merged with neighboring compressed access units, and further determine an address of one or more consecutive burst sections that include the target compressed access unit and other compressed access units neighboring the target compressed access. Subsequently, the one or more burst sections can be accessed with burst access.

In alternative examples, additional information can be included in the merge information table, such as a size of each compressed access unit. As a result, a compressed access unit included in a merged access unit can be separately addressable, for example, for the examples of FIG. 5 and FIG. 7. For the FIG. 6 example, based on the address offsets, each member of a merged access unit is addressable. The reader 118 can accordingly obtain a target compressed access unit without reading all data in the respective burst section.

Figure 8:
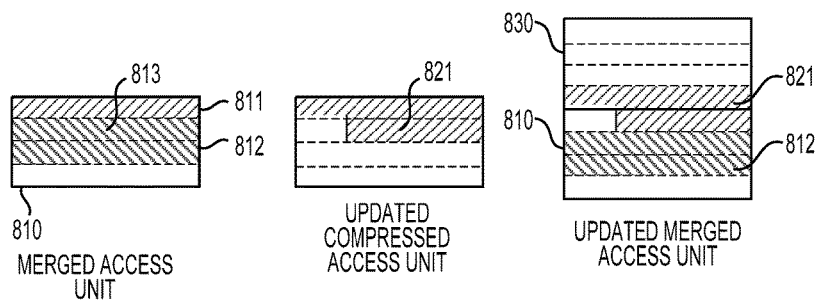
FIG. 8 shows an example of updating a compressed access unit included in a merged access unit according to an embodiment of the disclosure.

FIG. 8 shows an example of updating a compressed access unit 811 included in a merged access unit 813 according to an embodiment of the disclosure. A burst section 810 is shown at the left side of FIG. 8 which includes the merged access unit 813. The merged access unit 813 can include the compressed access unit 811 and a second compressed access unit 812. In one example, pixels in a raw access unit corresponding to the compressed access unit 811 are updated, and an updated access unit 821 is subsequently generated at the compressor 112. For example, two raw access units corresponding to the compressed access units 811 and 812 belong to an image. However, the two raw access units can belong to two separate image areas, such as two separate tiles, that are processed separately. A tile can be an image area partitioned according to the HEVC standard or a tile-based image processing method. Thus, the updated compressed access unit 821 can be generated as a result of a multiple-pass processing on the same tile.

In order to write the updated access unit 821 into the frame buffer, the writer 114 can first check a merge information table, such as the merge information table 630 in FIG. 6. As a result, the writer 114 can detect that the original access unit 811 has a smaller size (1 word) than a size (2 words) of the updated access unit 821. In addition, the original access unit 811 is located at a beginning of the burst section 810, and there are available spaces at an end of a neighboring burst section 830, as shown in FIG. 8. Subsequently, the writer 114 can change the merge information table. For example, the writer can change an address offset corresponding to the original compressed access unit 811 from 0 to −1. Then, the writer 114 can store the updated compressed access unit 821 to an address indicated by the merge information table as shown in FIG. 8. In this way, the compressed access unit 811 can be updated without reading the neighboring compressed access unit 812 out of the frame buffer 120 and then writing back an updated merged access unit including the compressed access units 821 and 812.

In some examples, the writer 114 can be configured to determine whether to combine a set of compressed access units into a merged access unit according to positions of the set of compressed access units in a video frame. In one example, two consecutive compressed access units can belong to two neighboring tiles, and the writer 114 can determine not to place the two compressed access units belonging to different tiles in a same merged unit. In this way, separately updating member compressed access units of a same merged access unit can be avoided. In addition, compressed access units belonging to different tiles have little correlation between each other. Thus, avoiding storing compressed access units belonging to different tiles in a merged access unit does not affect memory access efficiency.

In alternative examples, the writer 114 can avoid merging a compressed access unit located at a first boundary of a tile, or a video frame with another compressed access unit located at a second boundary of the tile, or the video frame opposite the first boundary. For example, the writer 114 can receive a set of compressed access units that are ordered according to a raster scan order, for example, from left to right and from top to bottom in a tile or a video frame. The set of compressed access units can include a first compressed access unit adjacent to a right tile or video frame boundary in a first scan row, and a second compressed access unit adjacent to a left tile or video frame boundary in a second scan row below the first scan row. Because pixel data in the first and second compressed access units has little opportunities to be processed together, merging the two units would result in unrequested data penalty when access to a merged access unit including the two units. Accordingly, the writer 114 can determine not to merge the set of compressed access units.

FIG. 9 shows an example of an access unit merging process 900 according to an embodiment of the disclosure. During the process 900, the writer 114 can merge compressed access units according to compression rates of the compressed access units. For example, a higher compression rate of a compressed access unit leads to a smaller size of the compressed access unit. Accordingly, for a set of compressed access units that have higher compression rates and smaller sizes, the set of compressed access units can be merged together to form one merged access unit, while for a set of compressed access units that have lower compression rates and larger sizes, the set of compressed access units can be merged into multiple merged access units. In this way, sizes of merged access units can be controlled to be below a certain threshold.

In one example, a cache mechanism is employed. When a compressed access unit is requested, the reader 118 is configured to read a whole merged access unit including the target compressed access unit from the frame buffer 120 with one or more burst access to the frame buffer 120. The unrequested compressed access units included in the merged access unit are cached for possible later needs. A larger merged access unit, when fetched from the frame buffer 120, can include a larger percentage of unrequired data, compared with a smaller merged access unit. The larger percentage of unrequired data can waste memory bandwidth and consist of a penalty to the cache mechanism. Accordingly, limiting sizes of merged access units to be below a certain threshold can benefit memory access efficiency.

In the process 900, a maximum number of compressed access units that a burst section can contain can be merged into a merged access unit. The merged access unit can subsequently be placed in the burst section. Specifically, a sequence 910 of compressed access units 911-916 can be received at the writer 114 that are to be placed into a sequence 920 of burst sections 921-926. As shown, the compressed access units 911-916 can have different sizes, and include different number of words. In addition, according to a configuration of the video coding system 100, each burst section 921-926 can have a size equal to a size of raw access units corresponding to the compressed access units 911-916.

The writer 114 can then calculate how many number of compressed access units from the beginning of the sequence 910 can be fit into the first burst section 921. As shown, the first three compressed access units 911-913 can having a total size of 3 words that is smaller than the size of the first burst section 921 (4 words). However, the fourth compressed access unit 914 has a size of two words and cannot be further included in the first burst section 921. Accordingly, the first three compressed access units 911-913 can be determined to be merged into a first merged access unit that can be placed in the first burst section 921.

Next, starting from the compressed access unit 914, the writer 114 can continue to determine which compressed access units are to be merged and placed into the fourth burst section 924. As shown, the writer 114 can determine the compressed access units 914 and 915 can be merged into a second merged access unit that can be stored in the fourth burst section 924. Although a space 932 of one word is available at the bottom of the burst section 932, the compressed access unit 916 cannot be further included in the fourth burst section 924 due to a size of the compressed access unit 916 (4 words) that is too large for the space 932.

Subsequently, the writer 114 can continue to determine a third merged access unit in a way similar to the above steps. For example, the writer can determine which compressed access units at the beginning of the remaining portion of the sequence 910 can be fit into the sixth burst section 926. As shown, the compressed access unit 916 can have a size of 4 words due to a low compression rate. Accordingly, the compressed access unit 916 itself can occupy all spaces of the burst section 926 leaving no room to include an additional compressed access unit.

After the above steps, a space 931 of one word in the burst section 921, the space 932, and the burst sections 922, 923, and 925 are left unoccupied. In addition, each merged access unit is aligned to a home address of a first compressed access unit in respective merged access unit. In this way, with support of the merge information as described in the FIGS. 5-7 example, the merged access units can be located in the frame buffer 120.

During the process 900, after a merged access unit is determined, merge information corresponding to the compressed access units 911-916 or the merged access units can be created accordingly. Subsequently, the members of each merge access unit can be stored to a respective burst section with one burst access, and the merge information can be also stored into a merge information table.

While the size of the merged access units are limited to be smaller than one burst section in the example process 900, more than one burst sections can be used to hold a merged access unit in other examples. For example, a maximum number of compressed access units that can be stored into two burst sections can be merged to form one merged access unit in an alternative example.

FIGS. 10A-10B show examples of reading a compressed access unit with burst access according to an embodiment of the disclosure. In the examples, the writer 118 can dynamically determine which group of compressed access units to be read out of the frame buffer 120 with burst access. Particularly, the reader 118 is configured to determine a merged access unit including requested data according to merge information stored in a merge information table, and read the merged access unit out of the frame buffer 120 with burst access. For example, the reader 118 can receive a request for a compressed access unit. The reader 118 can first determine a set of access units neighboring the requested compressed access unit. For example, neighboring compressed access units before or after the target access unit within a certain range in a sequence of compressed access units can be selected.

Then, the reader 118 can read merge information corresponding to each selected neighboring compressed access units and the target compressed access units from a merge information table. The merge information can be similar to the merge information as described in the examples of FIGS. 5 and 6. Subsequently, the writer 118 can check the obtained merge information, and determine a merged access unit that includes the target access unit. For example, the merge information can indicate how the neighboring access units and the target unit are formed into one or more merged access units. Finally, the writer 118 can read the determined merged access unit from the frame buffer with one or more bursts of reading operation.

In the FIG. 10A example, a set of compressed access units 1011-1014 are merged into a merged access unit 1021. The access unit 1012 is the requested data. The merged access unit 1021 resides within two of a group of burst sections 1020. Each burst section can have a size equal to a size of raw access units corresponding to the compressed access units 1011-1014. Under such scenario, when the reader 118 receives the request for the compressed access unit 1012, the reader 118 can acquire merge information of the compressed access units 1011-1014, and checks the merge information to find that the requested data is included in the merged access unit 1021. Subsequently, the merged access unit 1021 can be read out of the frame memory with two bursts of reading operations.

In the FIG. 10B example, four compressed access units 1031-1034 are merged to form two merged access units 1041-1042 due to lower compression rates compared with the FIG. 10 example. The two merged access units 1041-1042 are stored in a group of burst sections 1040 having a similar configuration to the burst sections 1020. The compressed access unit 1032 is the requested access unit that is included in the merge access unit 1041. Based on merge information of each compressed access units 1031-1034, the writer 118 can determine that the merged access unit 1041 includes the requested data, and read the merged access unit 1041 with two bursts of reading operations.

In an alternative example, after a merged access unit including a requested compressed access unit is located as described above, the writer 114 can check to see if a size of the located merged access unit is larger than a preselected threshold. When the merged access unit is larger than the preselected threshold, the writer 114 can only read the requested compressed access unit from the frame buffer 120 instead of the whole merged access unit. In this way, penalty caused by unrequested data in the large merged access unit can be avoided. For example, in FIG. 10A, assuming a threshold is preselected to be a size of one burst section, the writer 114 can determine that the merged access unit 1021 is larger than this threshold, and consequently read the requested access unit 1012 from the frame buffer 120.

Conversely, when the merged access unit is smaller than the threshold, the whole merged access unit can be read out with a burst access to take advantage of the high memory efficiency caused by burst access. In this alternative example, information of lengths of each compressed access unit can be stored in the merge information when creating merged access units, and later used during the read process.

FIG. 11 shows an example of a frame buffer format 1100 according to an embodiment of disclosure. As shown in the example, two raw access units 1101-1102 are compressed to generate two compressed access units 1141 and 1151 that are distributed in two burst sections 1142 and 1152. Each of the two raw access units 1101-1102 can include two encoding units (EU). An EU can refer to a block of pixels that is used as a processing unit during a video coding process. An EU can correspond to a coding block as defined according to the HEVC standards in some examples. In the FIG. 11 example, the raw access unit 1101 can include two EUs 1121R and 1122R that correspond to two compressed EUs 1121C and 1122C. Similarly, the raw access unit 1102 can include two EUs 1131R and 1132R that correspond to two compressed EUs 1131C and 1132C.

In one example, length (or size) information of each compressed EU 1121C-1122C and 1131C-1132C are stored in a sequence of EU headers 1161-1164. For example, in FIG. 11, each burst section 1142 or 1152 can have a size of 8 words, and each raw access unit 1101-1102 can have a same size as each burst section. Each EU 1121R, 1122R, 1131R and 1132R can have a size of 4 words. After compression, each compressed EU 1121C, 1122C, 1131C and 1132C can have a length of 1, 2, 3 or 4 words depending on respective compression rates. Accordingly, each possible length can be represented with a bit sequence. In FIG. 1 example, a length of 1, 2, 3, or 4 words is represented by a sequence of two bits (referred to as an EU header). Thus, the lengths of the four compressed EU 1121C, 1122C, 1131C and 1132C are represented as 10, 01, 00 and 11, respectively, and stored in the sequence of EU headers 1161-1164.

In the frame buffer format 1100, a sequence of raw or compressed access units can be mapped and stored to a sequence of burst sections in the frame buffer 120. The sequence of headers 1161-1164 can also be stored in the frame buffer 120, and the order of the sequence of headers can be arranged the same as an order of the compressed EUs in the sequence of burst sections. In this way, length information can be located when a compressed EU is requested from the reader 118.

In one example, a reference frame has a format of YUV420, and each pixel has a depth of 8 bits. The reference frame can be compressed and stored into the frame buffer 120 using the frame buffer format 1100. Specifically, an EU of Y component can have a size of 16×4 pixels, while an EU of Cb/Cr component can have a size of 8-CbCr-pair×4 pixels. One CbCr-pair may contain 1 Cb pixel and 1 Cr pixel. Two consecutive EUs in vertical direction form an access unit. The access units can be processed row by row or column by column. Accordingly, the access units can be stored in the frame buffer 120 in an order determined by the processing order. In addition, the Y component data and CbCr component data can be separately stored forming two sequences of compressed access units. In addition to the pixel data, EU headers corresponding to each EU can be also stored in the frame buffer 120 with the Y component EU headers and CbCr component EU headers stored in separate sequences. Further, starting addresses of the four sequences (two pixel data sequences and two EU header sequences) can be configurable.

While each access unit in the FIG. 11 example includes two EUs, more than two EUs can be included in one access unit in alternative examples. Accordingly, each burst section can include more than two compressed EU each corresponding to an EU header containing EU length information.

Figure 12:
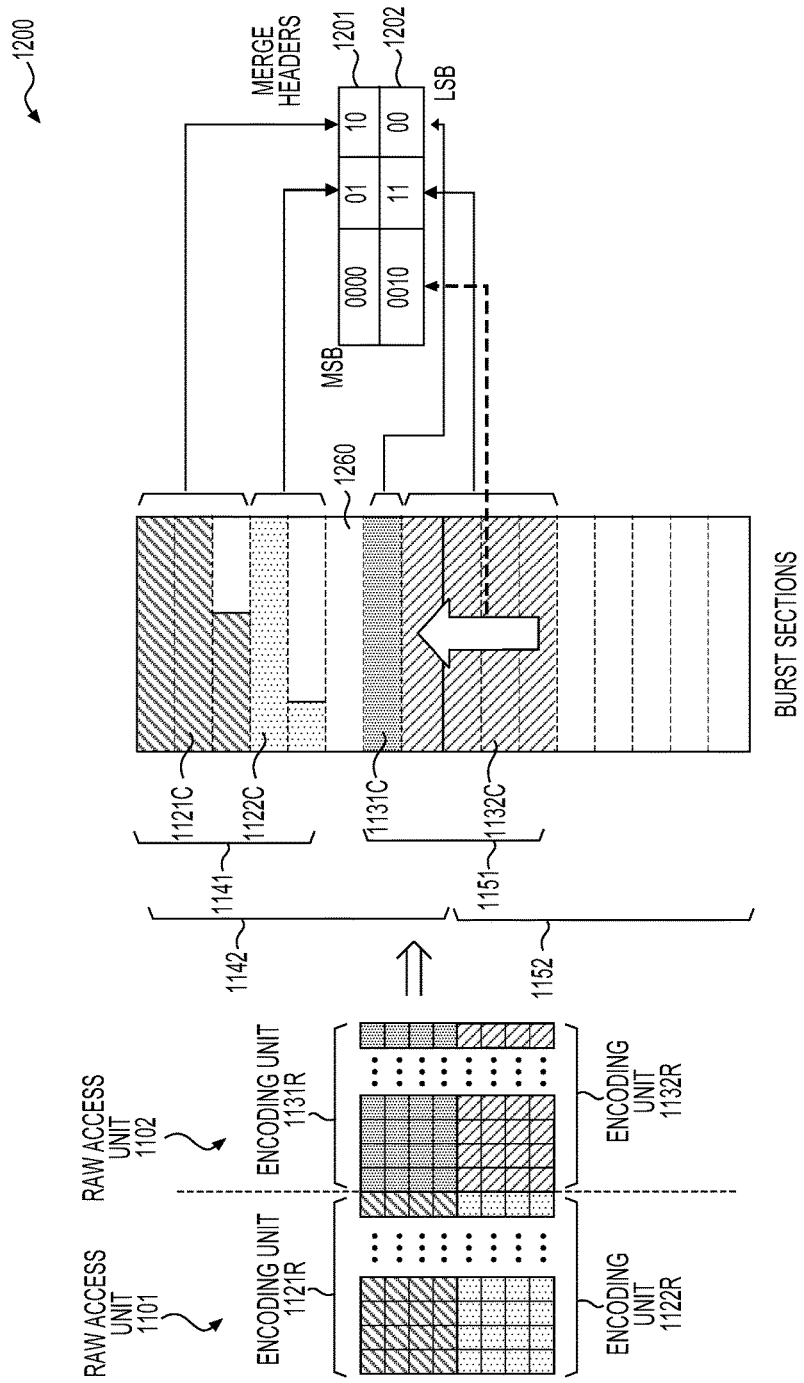
FIG. 12 shows an example of a second frame buffer format according to an embodiment of the disclosure.

FIG. 12 shows an example of a second frame buffer format 1200 according to an embodiment of the disclosure. The frame buffer format 1200 can be used with the access unit merging mechanism, and merge information can be included in this frame buffer format 1200. As shown in FIG. 12, the same raw access units 1101-1102 are compressed to form the two compressed access units 1141 and 1151, however, the two compressed access units 1141 and 1151 are merged together forming a merged access unit. In the FIG. 12 example, address offsets of shifted compressed access units can be configured with a granularity of two words. Accordingly, the address offsets can be multiples of two words. Thus, the compressed access unit 1151 is shifted 2 words up to be adjacent to the compressed access unit 1141. A one-word gap 1260 exists between the two adjacent compressed access units 1141 and 1151.

Accordingly, the frame buffer format 1200 includes a sequence of merge headers 1201-1202 each including merge information indicating the merging operation as well as the EU length information. Specifically, each merge header 1201 or 1202 can include a field for storing merge information, such as an address offset. As shown, the first merge header 1201 corresponds to the first compressed access unit 1141, and an address offset of "0000" is included as the first four most significant bits (MSB). Similarly, the second merge header 1202 corresponds to the second compressed access unit 1151, and an address offset of "0010" is included as the first four most significant bits indicating the compressed access unit 1151 is shifted 2 words away from a home address of the compressed access unit 1151.

In various examples, address offsets of shifted compressed access units can be configured with different granularities, such as 4, 8, 16, or 32 bytes, or other granularity. For example, a frame buffer has a bus width of 16 bytes in one example, and accordingly one word corresponding to the bus width has a same size of 16 bytes. Due to certain technical property of the frame buffer, two-word-aligned compressed access units can lead to a higher memory access efficiency compared with one-word-aligned arrangement. Accordingly, a granularity of address offsets can be configured to be 32 bytes equal to a length of two words of the frame buffer. As a result, a compressed access unit can be shifted with a distance of 2 words, 4 words, 6 words, and the like. Accordingly, in some scenarios, the shifted compressed access unit may be adjacent to a previous compressed access unit with a one-word length gap existing in a resultant merged access unit. For address offsets with other lengths of granularities, a gap between two adjacent compressed access units may have a different length other than a one-word length.

In addition, the frame buffer format 1200 can further include two fields for storing compressed EU length information similar as what is stored in EU headers in the FIG. 11 example. In alternative examples, when an access unit includes more than two EUs, a merger header can include more than two fields for storing compressed EU length information. Additionally, arrangement of fields in a merge header can be different from what is shown in the FIG. 12 example. For example, the fields of merge information and length information can be configured to be in any order.

While two compressed access units are shown in the FIG. 12 example, more than two compressed access units can be merged into one merged access unit in other examples. In addition, when compression rates of respective compressed access units are high, the merged access unit can be contained within one burst section. The compressed data and the merge headers in FIG. 12 example can be stored in a way similar to the compressed data and the EU headers in FIG. 11 example. For example, compressed data and merge headers corresponding to different color components can be stored at different configurable locations in the frame buffer 120.

Figure 13:
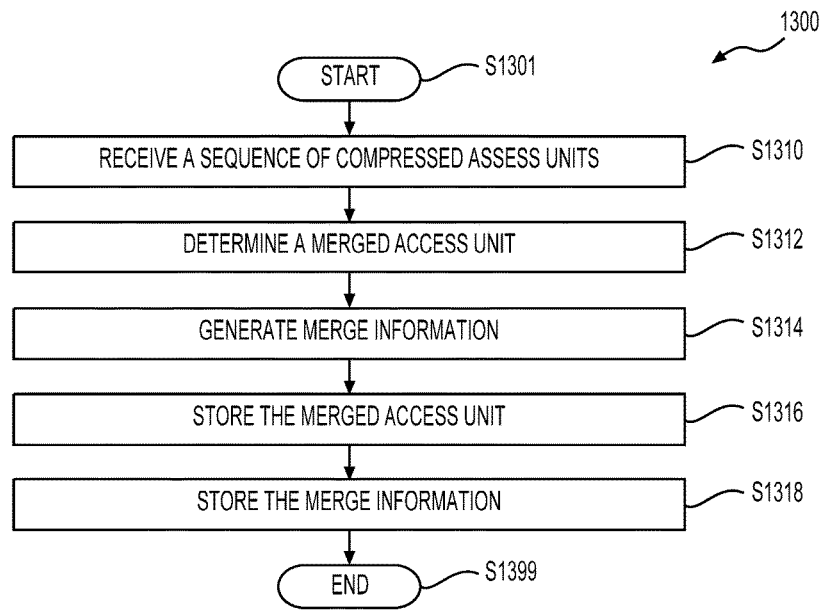
FIG. 13 shows a process for merging compressed access units into merged access units according to an embodiment of the disclosure.

FIG. 13 shows a process 1300 for merging compressed access units into merged access units according to an embodiment of the disclosure. The process 1300 can be performed in the coding system 100 by the writer 114. The process 1300 can start from S1301 and proceeds to S1310.

At S1310, a sequence of compressed access units can be received at the writer 114 from the compressor 112. For example, an image, a video frame, or a portion of an image or video frame, can be partitioned into a sequence of access units each including a block of pixels. The access units can first be compressed at the compressor 112 to generate the sequence of compressed access units that are subsequently provided to the writer 114. As described, the frame buffer 120 can include a sequence of burst sections that can be accessed with burst access. A size of the burst section can equal an amount of data read from the frame buffer 120 during one burst of reading or writing operation.

Each compressed access unit can correspond to a burst section. Assuming no access unit merging is performed, the sequence of compressed access units can be sequentially stored into the sequence of burst sections with each burst section containing one compressed access unit. A starting address of each burst section can be a home address of the respective compressed access unit.

At S1312, a merged access unit can be determined according to compression rates of the sequence of compressed access units. The merged access unit can include at least two consecutive compressed access units in the sequence of compressed access units. In a first example, when a subset of the sequence of compressed access units, for example, two or four compressed access units, as a whole has a compression rate higher than a threshold, such as 50%, the subset of the sequence of compressed access units can be determined to be merged into a merged access unit.

In a second example, the merged access unit can include a maximum number of consecutive compressed access units that can be contained in a burst section. For example, the writer 114 can try to include as many as possible compressed access units into the burst section as far as a total size of the compressed access units is smaller or equal to the size of the burst section. In alternative examples, more than one consecutive burst sections can be used to contain a merged access unit. In addition, compressed access units belonging to different tiles of the video frames are not included in one merged access unit.

At S1314, merge information can be generated for the merged access unit or members of the merged access unit. For example, as described in the examples of FIGS. 5-7, different types of merge information representation methods can be used. Accordingly, the merge information can correspond to each compressed access unit, such as the merge enable tag or address offset merge information, or can correspond to the merged access unit, such as the size of uncompressed access units corresponding to members of the merged access unit.

In addition, merge information can be generated for a non-merged compressed access unit indicating the respective compressed access unit is not merged with other compressed access unit. Further, the merge information can be later used for addressing a merged access unit, a member of a merged access unit, or a non-merged access unit such that a merged access unit, a member of a merged access unit, or a non-merged access unit can be read from the frame buffer 120.

At S1316, the merged access unit(s) is stored in the frame buffer 120. At S1318, the merge information is stored in the frame buffer 120 or another memory separate from the frame buffer 120. The process 1300 can proceed to S1399 and terminate at S1399.

Figure 14:
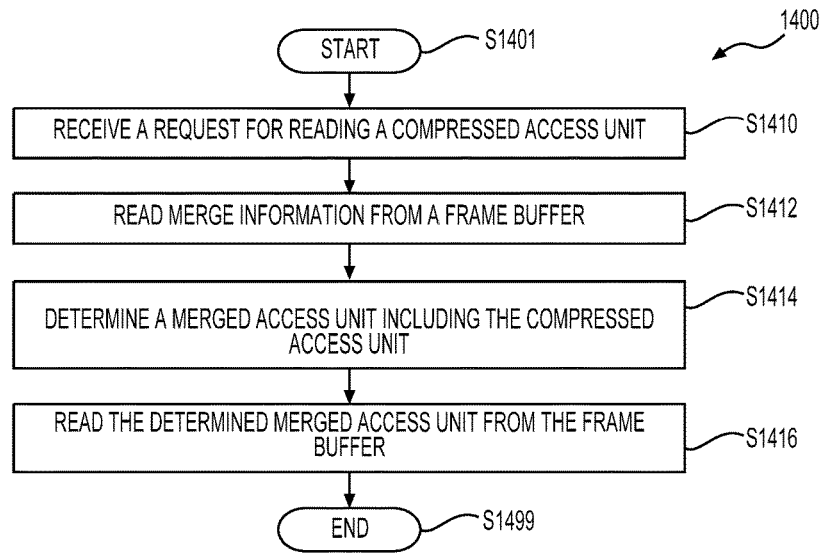
FIG. 14 shows a process for reading a compressed access unit from a frame buffer that includes merged access units according to an embodiment of the disclosure.

FIG. 14 shows a process 1400 for reading a compressed access unit from a frame buffer that includes merged access units according to an embodiment of the disclosure. The process 1400 can be performed in the coding system 100 by the reader 118. The process 1400 can start from S1401, and proceeds to S1410.

At S1410, a request for a compressed access unit can be received at the reader 118. The requested compressed access unit can be one of a sequence of compressed access units corresponding to a sequence of blocks in an image or a video frame. In addition, the sequence of compressed access units can be stored in the frame buffer 120 by the writer 114 that employs the access unit merging scheme to improve memory efficiency. Accordingly, merged access units can be generated and stored in the frame buffer 120.

At S1412, merge information related with the requested access unit can be read from the frame buffer 120 or another memory storing the merge information by the reader 118. For example, the merge information can take one of the formats described in the examples of FIGS. 5-7. For example, enable flags or address offsets corresponding to a set of compressed access units neighboring the requested access unit can be acquired. In addition, the merge information can include length information of the requested access unit and compressed access units neighboring the requested access unit.

At S1414, a merged access unit including the requested access unit can be determined based on the merged information acquired at S1412. For example, addresses of one or more burst sections can be determined such that the respective burst sections containing the determined merged access unit can be addressed. In addition, an address of the requested access unit can also be determined in one example. Further, a size of the determined access unit can also be determined in one example.

At S1416, the determined merged access unit including the requested access unit can be read from the frame buffer 120 with burst access in one example. In alternative examples, the reader 118 can first check whether the size of the determined merge access unit is smaller than a threshold. If so, the reader 118 can continue to read the determined merge access unit including the requested access unit from the frame buffer 120 with burst access. Otherwise, the reader 118 can only read the requested access unit from the frame buffer 120 to avoid the penalty caused by unrequested data. The process 1400 can proceed to S1499, and terminates at S1499.

In various examples, the writer 114, the reader 118, the compressor 112, the decompressor 116, or the video codec 110 can be implemented with hardware, software, or combination thereof. In one example, those components 112, 114, 116, and 118 are implemented with one or more integrated circuits (ICs), such as an application specific integrated circuit (ASIC), field programmable gate array (FPGA), and the like. In another example, functions of those components 112, 114, 116, and 118 are implemented with software or firmware including instructions stored in a computer-readable non-volatile storage medium. The instructions, when executed by a processing circuit, causing the processing circuit to perform the respective functions.

While the video coding system 100 is used as an example for explaining the access unit merging scheme, the functions and processes related with the access unit merging scheme is not limited to a video coding system. For example, the access unit merging scheme can be applied or included in other various applications and apparatuses, such as an image signal processor (ISP), a display device, a graphics processing unit (GPU), a multimedia engine, and a like. Accordingly, the access unit merging scheme can be applied to images as well as video frames. For example, an ISP can implement the functions of the writer 114 in FIG. 1 example, to generate and store merged compressed access units of images or video frames into a frame buffer that are subsequently fetched by a GPU or display device that can implement the functions of the reader 118 in FIG. 1 example. A multimedia engine may include hardware and software performing functions of a video codec. Accordingly the functions of the writer 114 and the reader 118 can be implemented in the multimedia engine for access to a frame buffer storing video frames.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   receiving a sequence of compressed access units with variable sizes, the sequence of compressed access units being obtained by compressing a sequence of raw access units partitioned from an image or a video frame; and
   determining a merged access unit including at least two consecutive compressed access units of the sequence of compressed access units based on compression rates of the sequence of compressed access units and/or positions of the sequence of compressed access units in the image or video frame,
   wherein the merged access unit is to be stored in a preselected number of consecutive burst sections in a frame buffer with a reduced gap between the at least two consecutive compressed access units compared with storing the at least two consecutive compressed access units in separate burst sections, and
   the merged access unit includes a maximum number of consecutive compressed access units of the sequence of compressed access units that can be contained in the preselected number of consecutive burst sections.

2. The method of claim 1, wherein the frame buffer includes a sequence of burst sections partitioned by burst boundaries, and the method further comprises:
   storing the merged access unit into the frame buffer, wherein the merged access unit is aligned to a burst boundary of the preselected number of consecutive burst sections of the frame buffer, and members of the merged access unit are adjacent to each other.

3. The method of claim 1, wherein the determining the merged access unit includes:
   when the at least two consecutive compressed access units as a whole have a compression rate larger than a preselected percentage, determining to merge the at least two consecutive compressed access units into the merged access unit.

4. The method of claim 1, wherein the determining the merged access unit includes:
   avoiding arranging the compressed access units of the sequence of compressed access units belonging to different tiles in the image or the video frame in the merged access unit.

5. The method of claim 1, wherein the determining the merged access unit includes:
   avoiding arranging a first compressed access unit adjacent to a first boundary of a tile or the image or the video frame and a second compressed access unit adjacent to a second boundary of the tile or the image or the video frame in the merged access unit, the second boundary being opposite to the first boundary, the first and second compressed access units being members of the sequence of compressed access units.

6. The method of claim 1, further comprising:
receiving an updated compressed access unit having a larger size than a to-be-updated compressed access unit that belongs to the merged access unit and is aligned with a burst boundary of a first burst section of the preselected number of consecutive burst sections in the frame buffer; and
storing the updated compressed access unit at a starting address in a second burst section that is a previous burst section adjacent to the preselected number of consecutive burst function at the burst boundary of the first burst function in the sequence of burst sections.

7. The method of claim 1, further comprising:
generating a sequence of merge information corresponding to the compressed access units of the merged access unit or the merged access unit indicating how the sequence of compressed access units are merged into the merged access unit such that when one of the compressed access units of the merged access unit is requested, the merged access unit including the requested access unit can be determined among multiple merged access units according to the merge information.

8. The method of claim 7, wherein the merge information is represented with one of:
a merge enable tag assigned for each compressed access unit,
an address offset of each compressed access unit with respect to a home address of each compressed access unit, and
a total size of uncompressed access units corresponding to members of a merged access unit.

9. The method of claim 1, wherein each compressed access unit includes at least two compressed encoding units each having a length, and the method further comprising:
generating a sequence of encoding unit headers each corresponding to a compressed encoding unit and including length information of the respective compressed encoding unit.

10. The method of claim 1, wherein each compressed access unit includes at least two compressed encoding units each having a length, and the method further comprising:
generating a sequence of merge headers each corresponding to a compressed access unit,
wherein each merge header includes at least two fields each storing length information of the respective at least two compressed encoding units in the respective compressed access unit, and
each merge header further includes a field storing an address offset of the respective compressed access unit with respect to a home address of the respective compressed access unit.

11. The method of claim 10, wherein the sequence of compressed access units and the sequence of merge headers are stored separately with configurable starting addresses.

12. The method of claim 1, wherein the frame buffer is one of a random access memory (RAM), a static RAM (SRAM), a dynamic RAM (DRAM), an asynchronous DRAM, a synchronous DRAM (SDRAM), a double data rate SDRAM (DDR SDRAM), a flash memory.

13. A method, comprising:
receiving a request for reading a compressed access unit from a frame buffer storing a sequence of compressed access units part of which are merged into merged access units and a sequence of merge information corresponding to each compressed access unit or merged access unit indicating how compressed access units are merged into the merged access units;
determining a merged access unit including the requested access unit according to merge information related with the requested compressed access unit; and
reading compressed data in the determined merged access unit that includes the requested access unit from the frame buffer.

14. The method of claim 13, further comprising:
when a size of the merged access unit is above a threshold, reading the requested access unit from the frame buffer.

15. The method of claim 13, wherein the frame buffer includes a sequence of burst sections partitioned by burst boundaries, the merged access units are each aligned to a burst boundary of the frame buffer, and members of each merged access unit are adjacent to each other.

16. The method of claim 13, wherein the merge information is represented using one of:
a merge enable tag corresponding to each compressed access unit,
an address offset of each compressed access unit with respect to a home address of the respective compressed access unit, and
a total size of uncompressed access units corresponding to members of a merged access unit.

17. The method of claim 16, wherein reading merge information related with the requested compressed access unit from the frame buffer includes one of:
reading merge information corresponding to the requested compressed access unit and compressed access units neighboring the requested access unit in the sequence of compressed access units, and
reading merge information corresponding to the merged access unit that includes the requested access unit.

18. An apparatus, comprising circuitry configured to:
receive a sequence of compressed access units with variable sizes, the sequence of compressed access units being obtained by compressing a sequence of raw access units partitioned from an image or a video frame; and
determine a merged access unit including at least two consecutive compressed access units of the sequence of compressed access units based on compression rates of the sequence of compressed access units and/or positions of the sequence of compressed access units in the image or video frame,
wherein the merged access unit is to be stored in a preselected number of consecutive burst sections in a frame buffer with a reduced gap between the at least two consecutive compressed access units compared with storing the at least two consecutive compressed access units separate burst sections, and
the merged access unit includes a maximum number of consecutive compressed access units of the sequence of compressed access units that can be contained in the preselected number of consecutive burst sections.

19. The apparatus of claim 18, wherein the frame buffer includes a sequence of burst sections partitioned by burst boundaries, and the circuitry is further configured to:
store the merged access unit into the frame buffer, wherein the merged access unit is aligned to a burst boundary of the preselected number of consecutive burst sections of the frame buffer, and members of the merged access unit are adjacent to each other.

* * * * *